United States Patent [19]

Miyadera et al.

[11] Patent Number: 4,664,023
[45] Date of Patent: May 12, 1987

[54] AIR DIFFUSING REGISTER

[75] Inventors: Kazuhiho Miyadera, Toyota; Masahiko Ohoka, Kariya, both of Japan

[73] Assignee: Toyota Jidosha Kabushiki Kaisha, Aichi, Japan

[21] Appl. No.: 790,879

[22] Filed: Oct. 24, 1985

[30] Foreign Application Priority Data

Oct. 29, 1984 [JP] Japan .................. 59-163397[U]

[51] Int. Cl.⁴ .................................. F24F 13/10
[52] U.S. Cl. ................................. 98/41.1; 98/2; 98/114
[58] Field of Search .............. 98/2, 40.23, 40.26, 98/40.27, 41.1, 110, 114, 121.2

[56] References Cited

U.S. PATENT DOCUMENTS 3,602,127 8/1971 Walker ................... 98/121.2 X
4,043,258 8/1977 Zitko et al. ............... 98/121.2
4,184,288 1/1980 Magill et al. ............. 98/110 X

FOREIGN PATENT DOCUMENTS 1227157 4/1971 United Kingdom ............. 98/121.2

Primary Examiner—Harold Joyce
Attorney, Agent, or Firm—Kenyon & Kenyon

[57] ABSTRACT

An air diffusing register which comprises a register case disposed with a damper operating mechanism at the side thereof, a protector integrally formed with a register bezel for covering the damper operating mechanism, and engaged with the guide of the register case, thereby readily associating without increasing the number of parts and assembling steps and reliably preventing an interference between the wire harness and the damper operating mechanism and reducing the production cost. In this register, the protector can effectively prevent an interference between an wire harness and a damper operating mechanism without increasing the numbers of parts and associating steps, and readily assemble.

2 Claims, 5 Drawing Figures

AIR DIFFUSING REGISTER

BACKGROUND OF THE INVENTION

This invention relates to improvements in an air diffusing register of an air conditioner mounted mainly in a vehicle.

A conventional air diffusing register of an air conditioner used for an automobile is constructed, as disclosed in Japanese Utility Model Laid-open No. 65,334/84 official gazette, to dispose a damper operating mechanism as exposed at the side of a register case.

With the structure disclosed in Japanese Utility Model Laid-open No. 65,334/84, in which a wire harness D is designed to be disposed in the vicinity of a damper operating mechanism C having gears A and B as shown in FIG. 3, the register has such disadvantages that the harness D is disadvantageously engaged in mesh with or contacted with the gears A, B to cause the harness D to be damaged, and the damper operating mechanism C malfunctions.

Thus, as shown in FIG. 4, a protector E of bellows type which can bend and elongate is heretofore placed partly on the harness D near a damper operating mechanism C, or, as shown in FIG. 5, a protector F of another body is mounted on a register case G by utilizing clamps H, I to protect the mechanism C.

However, with the means shown in FIG. 4, the interference between the damper operating mechanism and the harness D or the protector E cannot be prevented, and the mechanism C might malfunction, and with the means shown in FIG. 5, the number of parts and assembling steps increase.

SUMMARY OF THE INVENTION

It is, accordingly, an object of this invention to provide an air diffusing register having a protector capable of reducing production cost, which can effectively prevent an interference between a wire harness and a damper operating mechanism without increasing the numbers of parts and associating steps, and which can be readily assembled.

This invention provides an air diffusing register which comprises a register case disposed with a damper operating mechanism at the side thereof, a protector integrally formed with a register bezel for covering the damper operating mechanism, and engaged with the guide of the register case, thereby readily associating without increasing the number of parts and assembled steps and reliably preventing an interference between the wire harness and the damper operating mechanism and reducing the production cost.

According to this invention, the protector for covering the damper operating mechanism is formed integrally with the register bezel. Thus, the protector can be associated simultaneously in the same step of associating the bezel with the register case, in which case the association can be completed merely by engaging the protector with the guide of the register case. Therefore, the increase in the number of parts and the assembling steps can be eliminated, and the interference between the wire harness and the damper operating mechanism can be effectively prevented. In addition, the protector can have the position holding function of the members of the damper operating mechanism.

BRIEF DESCRIPTION OF THE DRAWINGS

The above and other related objects and features of the invention will be apparent from a reading of the following description of the disclosure found in the accompanying drawings and novelty thereof pointed out in the appended claims.

DESCRIPTION OF THE PREFERRED EMBODIMENTS

Figure 1:
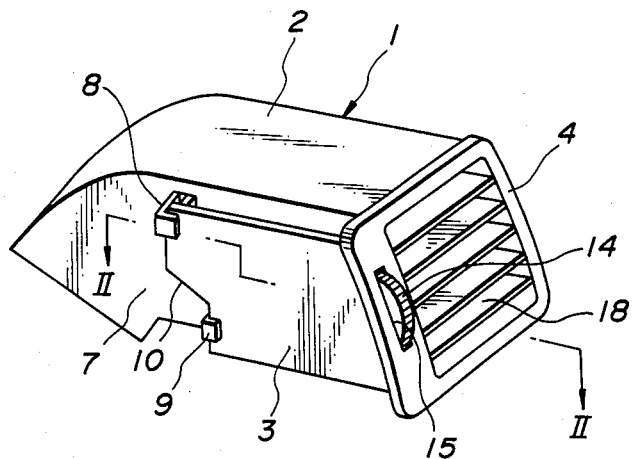
FIG. 1 is a perspective view of an embodiment of an air diffusing register according to this invention.

This invention will now be described in detail with reference to FIGS. 1 and 2, which show a first embodiment of an air diffusing register according to this invention. An air diffusing register 1 contains a switching damper in a register case 2, and a damper operating mechanism 3 for operating the damper is disposed in the side portion of the case 2.

On the other hand, a register bezel 4 is engaged by a connecting portion 5 with the entire periphery of the front side of the case 2, and a protector 6 having a width for covering the entire side of the mechanism 3 is formed integrally with the side portion of the case 2, and extended toward the backward direction of the case 2 along the side portion of the case 2.

Upper and lower guides 8 and 9 of hook shape are integrally projected from the side surface 7 of the case 2 for clamping the rear upper and lower ends 10 of the protector 6.

Figure 2:
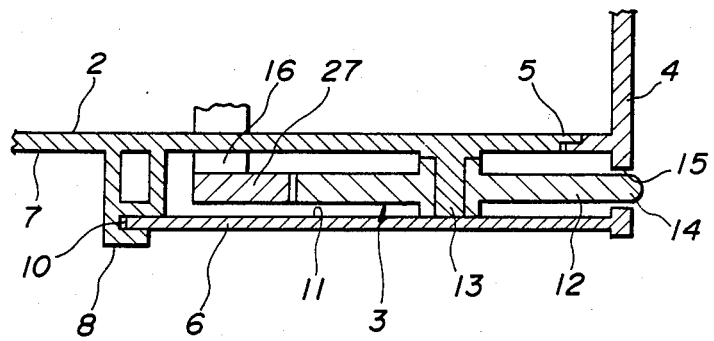
FIG. 2 is an enlarged sectional view, taken along the line II—II in FIG. 1.
Figure 3:
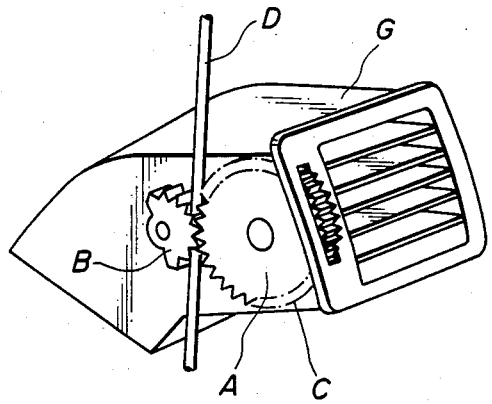
FIG. 3 is a perspective view of an example of a conventional air diffusing register.
Figure 4:
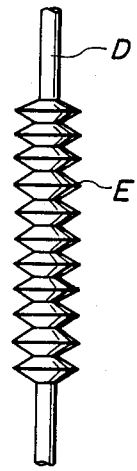
FIG. 4 is a side view of a wire harness attached with a protector.
Figure 5:
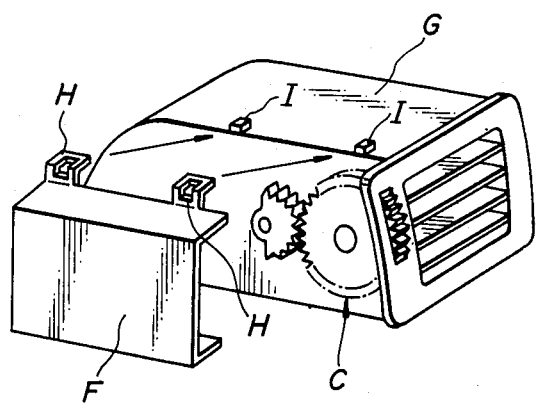
FIG. 5 is an exploded perspective view of another example of a conventional register.

As apparent from FIG. 2, the protector 6 is disposed at the outside of the damper operating mechanism 3. Thus, the inner surface 11 of the protector 6 is disposed near an operating dial 12 and its supporting shaft 13 in such a manner that the dial 12 is rotatably mounted on the shaft 13 for holding the dial 12 between the side surface of the case 2 and the protector 6.

The dial 12 is projected at the operating portion 14 thereof from an operation window 15 of the bezel 4, and engaged in mesh with a sector gear 27 fixedly secured to a damper operating shaft 16 provided in parallel with the shaft 13 at the rear side of the shaft 13 and secured to the side surface 7 of the case 2.

In FIG. 1, reference numeral 18 designates wind direction regulating fins elevationally aligned horizontally in parallel with each other within the peripheral edges of the bezel 4.

The bezel 4 having the abovementioned protector 6 at the side is engaged with the entire peripheral edge of the front side of the case 2, and the protector 6 is simultaneously disposed at the outside of the damper operating mechanism 3. Further, since the upper and lower rear edges 10 of the protector 6 are respectively engaged within the upper and lower guides 8 and 9, the protector 6 and the bezel 4 can be completely associated with the case 2 by one operation, and the interference between the damper operating mechanism 3 and the wire harness can be completely prevented by the protector 6.

According to this invention, the air diffusing register is constructed and operated as described above, and the interference between the wire harness and the damper operating mechanism can be reliably prevented without increasing the number of parts and assembling steps, the register can be readily associated, the production cost of the register can be reduced, and the protector can hold the damper operating mechanism at the suitable position.

What is claimed is:

1. An air diffusing register comprising:
    a register case having a side portion and an open front portion with a front peripheral edge;
    a damper operating mechanism disposed in the side portion of the register case;
    a separate register bezel engaged with the front peripheral edge of sid register case;
    a protector formed integrally with said register bezel and extending rearwardly from a side edge of said register bezel in spaced relation to said side portion of the register case to terminate in a rear portion, such that the protector covers said damper operating mechanism; and
    a supporting member connected to the side portion of the register case for supporting the rear portion of said protector.

2. The air diffusing register according to claim 1, wherein said supporting member comprises a hook shaped member integrally formed with and projecting from the side of said register case, the hook of said member engaging the rear portion of said protector.

* * * * *